(No Model.)

G. SEGSCHNEIDER.
PILE WIRE FOR LOOMS.

No. 383,545. Patented May 29, 1888.

WITNESSES:

INVENTOR.
Gustave Segschneider
BY
Goepel & Raegener
ATTORNEYS.

UNITED STATES PATENT OFFICE.

GUSTAVE SEGSCHNEIDER, OF YONKERS, NEW YORK, ASSIGNOR TO THE WARING HAT MANUFACTURING COMPANY, OF SAME PLACE.

PILE-WIRE FOR LOOMS.

SPECIFICATION forming part of Letters Patent No. 383,545, dated May 29, 1888.

Application filed February 15, 1888. Serial No. 264,071. (No model.)

*To all whom it may concern:*

Be it known that I, GUSTAVE SEGSCHNEIDER, of Yonkers, in the county of Westchester and State of New York, have invented certain new and useful Improvements in Pile-Wires for Looms, of which the following is a specification.

This invention relates to an improved head for pile-wires used in looms, said head being so constructed that the brazing or soldering of the head to the end of the pile-wire is dispensed with and a strong and reliable connection of the pile-wire with its head is obtained; and the invention consists of a head for pile-wires, the shank of which is provided with spring-jaws which engage the enlarged and flattened end of the pile-wire, said jaws being provided with grooves in their faces, so as to engage the edges of the flattened end of the pile-wire, as will appear fully hereinafter, and is finally pointed out in the claims.

Figure 1:
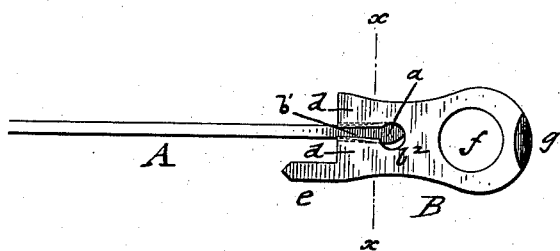
Figure 2:
Figure 3:
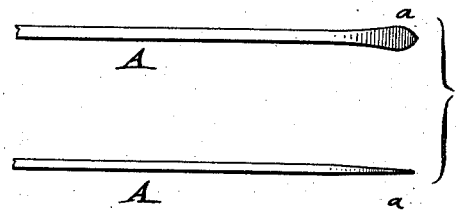
Figure 4:
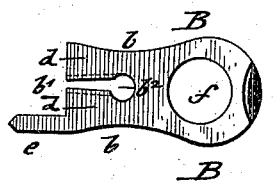

In the accompanying drawings, Figure 1 represents a side view of my improved head and part of a pile-wire of pile-cutting looms. Fig. 2 is a vertical transverse section on line $x$ $x$, Fig. 1. Fig. 3 represents a side and top view of the enlarged and flattened end of the pile-wire; and Fig. 4, a detail side view of the head, shown as detached from the pile-wire and ready to be driven on the end of the same.

Similar letters of reference indicate corresponding parts.

Referring to the drawings, A represents a pile-wire, which is provided at that end at which it is connected with its head B with an enlarged and flattened portion, $a$, which is made to taper toward the wire, as shown clearly in Fig. 3. The shank $b$ of the head B is provided with a tapering recess, $b'$, having an enlarged portion or eye, $b^2$, at the inner end, as shown clearly in Fig. 4. The faces of the tapering recess $b'$ are provided with V-shaped or other grooves, which serve to engage the edges of the enlarged end $a$ of the pile-wire A. The recessed shank $b$ of the head B forms tapering spring-shanks $d$ $d$, the grooved faces of which engage the enlarged end of the pile-wire, so as to be rigidly connected thereto without requiring any brazing or soldering of the head to the end of the pile-wire, which brazing or soldering effects an injurious influence on the pile-wire, as it tends to weaken it next to the head and causes the frequent breaking of the wire close to the head B. This is entirely avoided by my construction, as by the same the condition of the end of the pile-wire is not changed, but the uniform temper and texture of the same preserved.

The head B is driven on the enlarged and flattened end of the pile-wire A by placing the recessed shank on the enlarged end of the pile-wire and driving the spring-shanks of the head gradually by light blows over the enlarged end $a$ of the pile-wire until it is stopped in the enlarged eye $b^2$ of the recess $b'$, as shown in Fig. 1. In this manner a strong and reliable connection between the pile-wire and the head or eye of the same is provided.

The head or eye B is made of steel in the usual manner and provided with a gage, $e$, at the inner end and a large eye, $f$, for the engaging-hook, by which the wire is pulled through the pile for cutting the same, and a tapering portion, $g$, at the outer end for facilitating the entrance of the hook into the eye of the wire, which features, however, are well known and form no part of my invention, the essential features of which consist of the connection of the head with the enlarged end of the pile-wire by the spring-jaws described.

Having thus described my invention, I claim as new and desire to secure by Letters Patent—

1. The combination, with a pile-wire having an enlarged and flattened end, of a head the shank of which is provided with a tapering recess, forming spring-jaws for engaging the enlarged end of the wire, substantially as set forth.

2. The combination, with a pile-wire having an enlarged and flattened end, of a head the shank of which is provided with tapering spring-jaws for engaging the end of the pile-wire, substantially as set forth.

3. The combination, with a pile-wire having an enlarged and flattened end, of a head or eye the shank of which is provided with a tapering recess having an enlarged rear portion or eye, and with grooves in the faces of the recess, so as to form spring-jaws for engaging the enlarged end of the wire, substantially as set forth.

4. A head for pile-wires, the shank of which is provided with tapering spring-jaws having grooved faces, substantially as set forth.

5. A head for pile-wires, the shank of which is provided with a tapering recess having grooved edges and an enlarged rear portion or eye, substantially as set forth.

In testimony that I claim the foregoing as my invention I have signed my name in presence of two subscribing witnesses.

GUSTAVE SEGSCHNEIDER.

Witnesses:
PAUL GOEPEL,
JOHN A. STRALEY.